July 7, 1959 J. TALLMAN 2,893,192
CENTRAL DELIVERY HAY RAKE
Filed Feb. 19, 1957 4 Sheets-Sheet 1

John Tallman
INVENTOR.

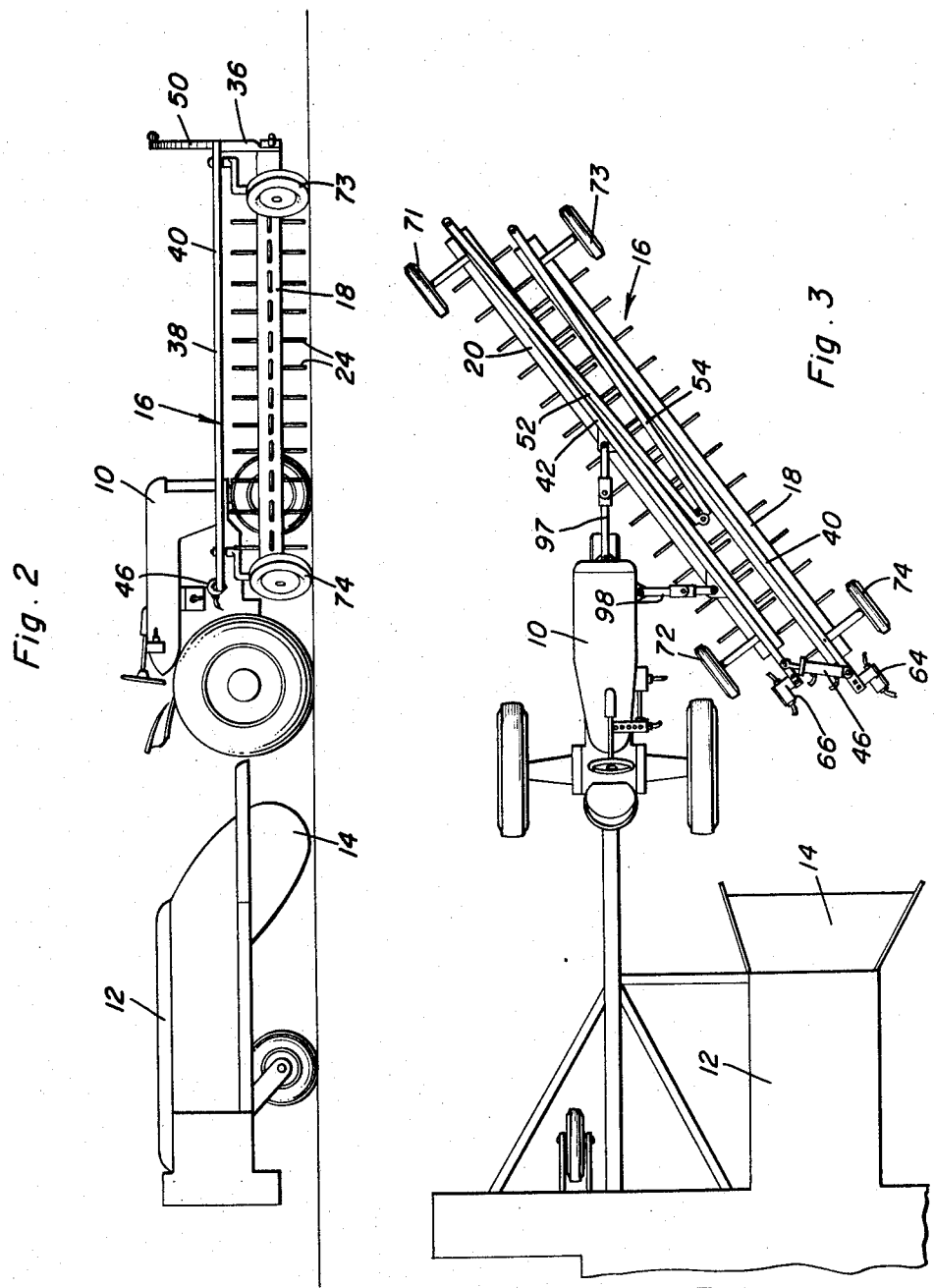

July 7, 1959    J. TALLMAN    2,893,192
CENTRAL DELIVERY HAY RAKE
Filed Feb. 19, 1957    4 Sheets-Sheet 3
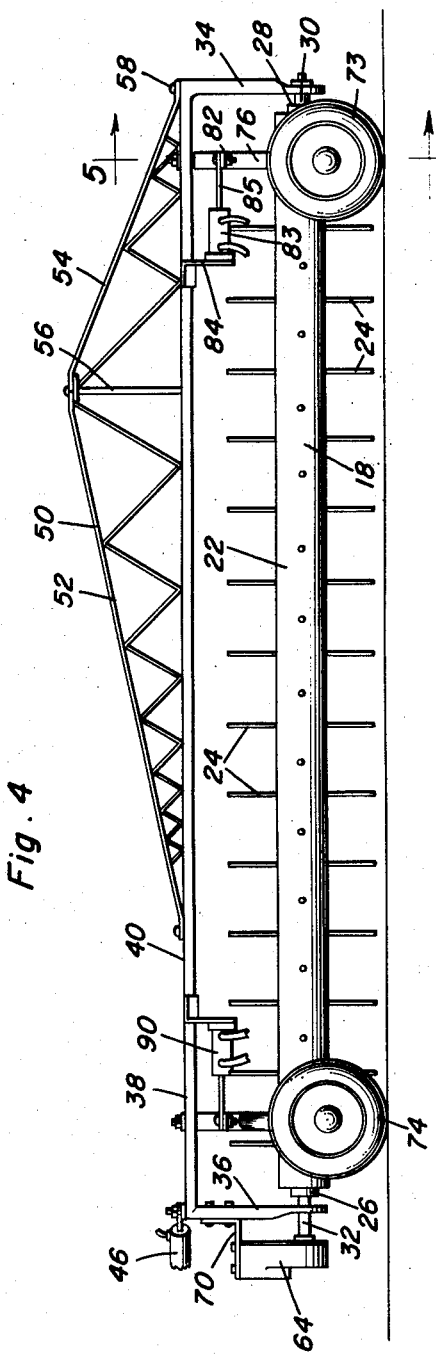
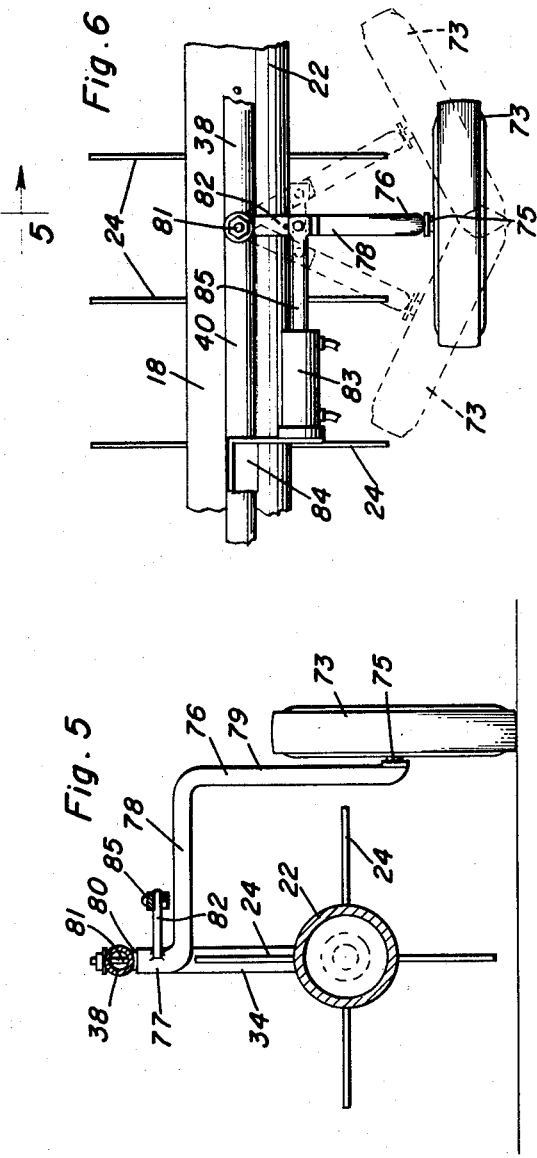
John Tallman
INVENTOR.
BY
*Attorneys*

July 7, 1959     J. TALLMAN     2,893,192
CENTRAL DELIVERY HAY RAKE
Filed Feb. 19, 1957     4 Sheets-Sheet 4
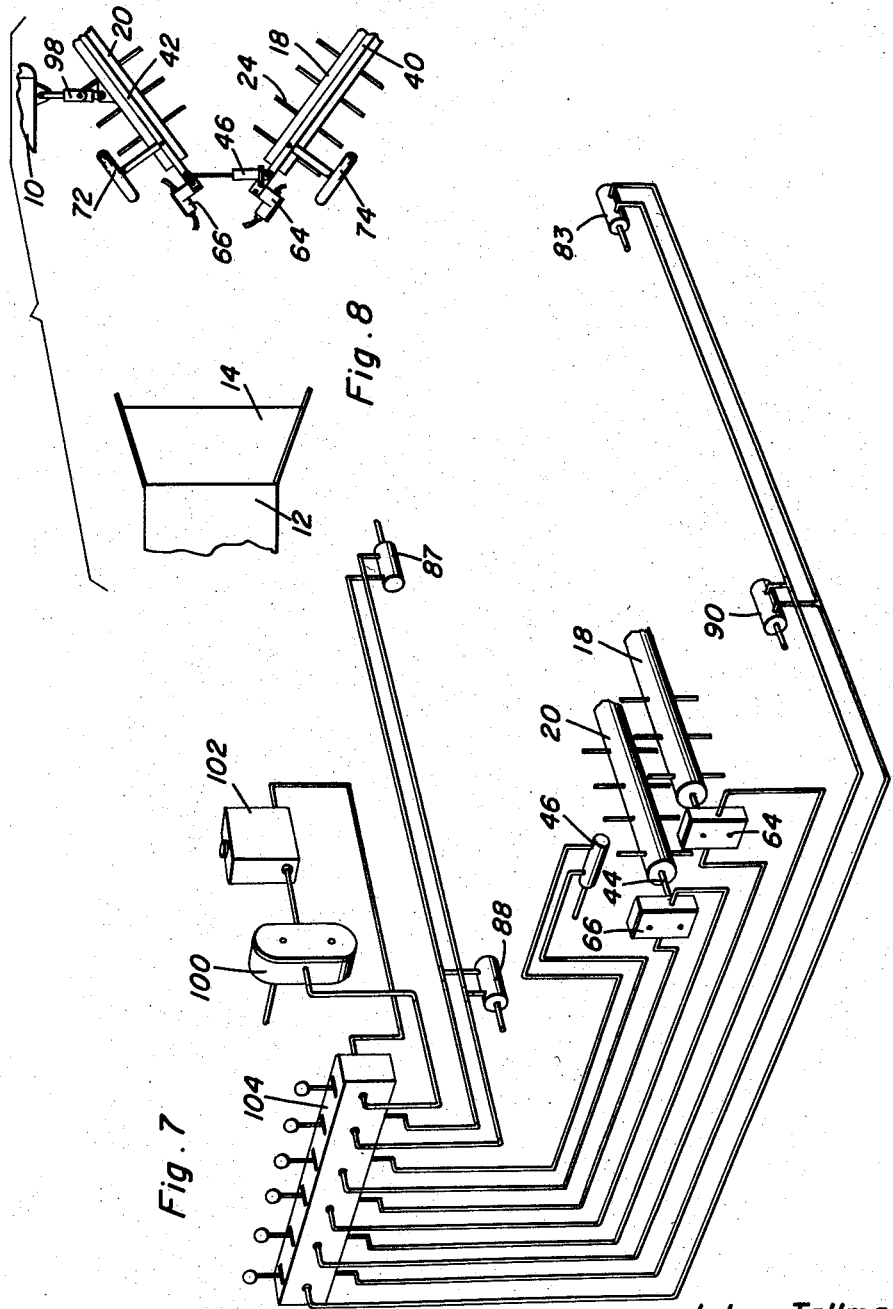
John Tallman
INVENTOR.

United States Patent Office 2,893,192
Patented July 7, 1959

2,893,192

CENTRAL DELIVERY HAY RAKE

John Tallman, Anamosa, Iowa

Application February 19, 1957, Serial No. 641,212

2 Claims. (Cl. 56—27)

This invention relates to a central delivery hay rake and more particularly to a rake which is designed to be used in conjunction with a combine, hay baler or other field harvester.

An object of the invention is to provide a central delivery hay rake which is adapted to be mounted in advance of a field harvester of any make, the rake having two rotary rake members which rake the hay into a windrow ready to be received in the hay baler. Accordingly, there is a considerable saving in time inasmuch as the rake operation and the baling operation is achieved with a single pass through the field.

In the ordinary practice, hay is first raked into a windrow. Frequently, the hay becomes wet and there is the additional job of turning the hay between rains and trying to dry it and keeping it from mildew. On the other hand, if there is a high wind after the field is raked and before the hay can be bailed, it blows over the field and necessitates a still further job.

If the hay can be left after it is mowed and does not have to be disturbed until baled, all of these risks are obviated and the cost of handling is cheaper. Furthermore with ordinary equipment and particularly during all of these extra operations, the hay is run over by the tractor wheels causing further waste.

Accordingly, another object of the invention is to provide a central delivery rake which will enable the farmer to more effectively and economically handle the hay after mowing.

A further object of the invention is to provide a rake as described above and which is adjustable so that any size of windrow may be made depending on the desires of the farmer.

Another object of the invention is to provide an improved rake construction which has no side draft on the tractor due to the inherent construction of the rake.

Another object of the invention is to provide a rake which is usable for windrowing the hay whether used in combination with a combine or not and the windrow may be made of a size to suit the needs of the farmer.

One of the important features of the invention is the construction enabling it to be folded for easy transportation and storage and the fact that it is operated by hydraulic power assists further facilitates the handling and use of the rake.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a side view of Figure 1;

Figure 3 is a top view of the rake in Figure 1 but showing the rake in a folded position;

Figure 4 is an enlarged elevational view of one side of the rake;

Figure 5 is an enlarged sectional view taken on the line 5—5 of Figure 4 and showing principally one of the adjustable front wheels of the rake;

Figure 6 is a top view of the wheel in Figure 5 showing in dotted line position a range of adjustment for the wheel;

Figure 7 is a schematic perspective view of a hydraulic system used with the rake, and;

Figure 8 is a fragmentary top plan view of the rake of Figure 1 showing an adjustment enabling a wider windrow to be made.

Figure 1:
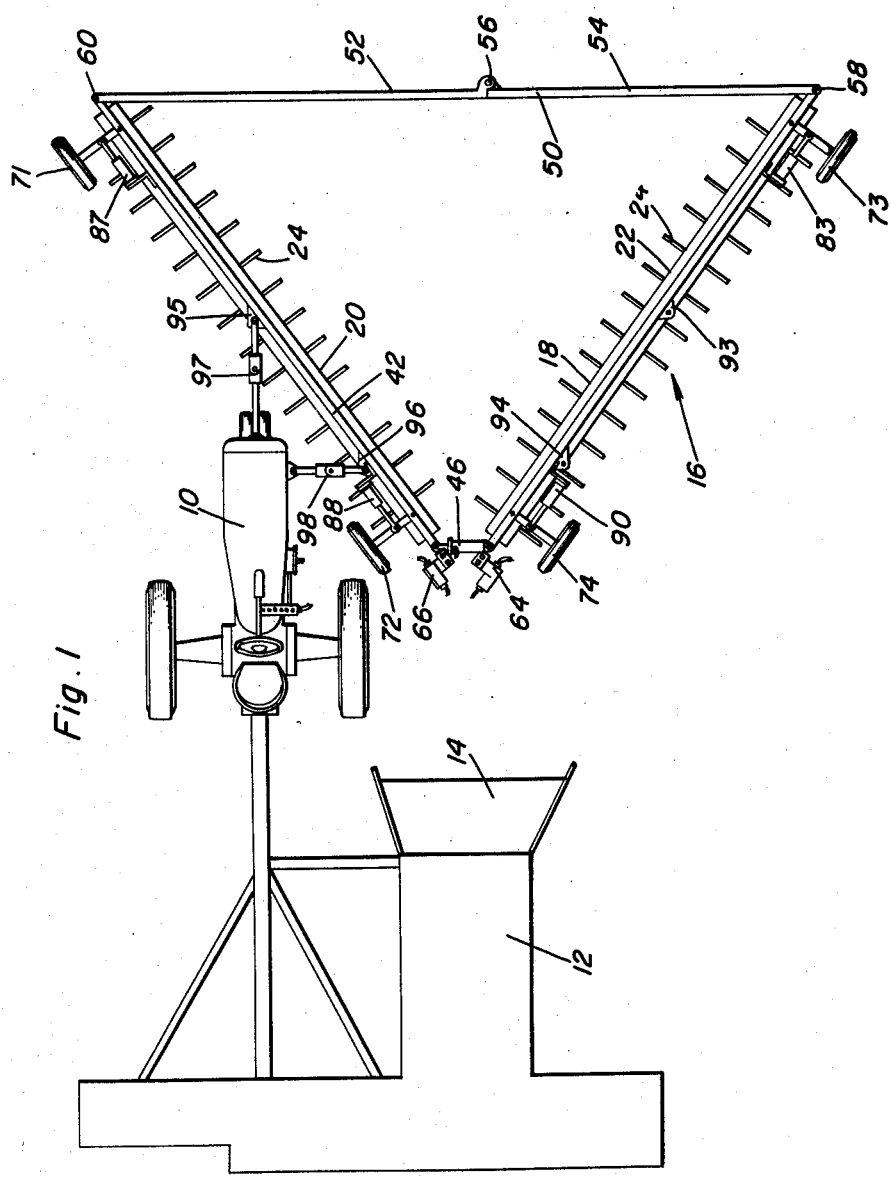
Figure 1 is a top view of a rake constructed in accordance with the invention showing the same mounted on one side of the same tractor which is pulling a hay baler.

In the accompanying drawings there is an ordinary tractor 10 of standard construction which is pulling a field harvester 12 whose inlet 14 is adapted to receive hay behind which there are mechanisms for baling the hay. Rake 16 which exemplifies the invention is attached to the tractor in advance of the baler and is adapted to form a windrow in the direct line travel of the inlet 14. The rake 16 may be mounted on either side of the tractor depending on the desires or needs of the farmer.

Rake 16 consists of two rotary rake members 18 and 20 respectively, and each is of identical construction. The rake member 18 consists of a cylinder 22 with four longitudinal rows of radially arranged tines 24 (Figure 5). There are bearings 26 and 28 at the ends of the cylinder 22 supporting spindles 30 and 32. These spindles are mounted for rotation in hangers 34 and 36 which depend from the frame member 38. The frame member 38 is a straight structural member while the hangers 34 and 36 are parallel to each other and at the ends thereof which form with the frame member 38 a frame 40.

Rake member 20 is supported by a frame 42, the latter having a pair of hangers by which the spindles 44 (Figure 7) of the rotary rake member 20 are mounted for rotation. The two frames 40 and 42 are connected at their rear ends by a hydraulic cylinder assembly 46 whose piston rod is pivoted to frame 42 and whose cylinder is pivoted to frame 40 at the upper rear corner thereof. The front end of the frames are interconnected by a structural assembly forming truss 50 which is made in two parts 52 and 54. The parts are connected together by a hinge 56 at the confronting ends thereof, the hinge pins being passed through aligned openings in the upper and lower frame members respectively thereof and in a location offset from the center in order to enable folding as shown in Figure 3. The extremities of the truss 50 are connected to the frames 40 and 42 at the upper front ends thereof by means of pivots 58 and 60. Expansion and retraction of the hydraulic cylinder assembly 46 will cause the conditions to exist as seen in comparison of Figures 1 and 8. This results in a wider or narrower windrow in the use and operation of the rake.

The rake members 18 and 20 are rotated from power taken from the tractor 10, all of the power for operating all parts of the rake being taken from this available source. Hydraulic motors 64 and 66 respectively are mounted by hangers 70 (Figure 5) on the vertical hangers at the rear ends of frames 40 and 42. These hydraulic motors are drivingly connected with the spindles 32 and 44 so that upon operation of the hydraulic motors the two rotary rake members are revolved in the proper direction to move the hay inwardly and rearwardly in response to forward movement of the tractor through the hay bale.

There are four wheels 71, 72, 73 and 74 respectively which support the rake. The wheels 71 and 72 are carried by frame 42 while wheels 73 and 74 are carried by the frame 40. Front wheels 71 and 73 are identical (Figure 5) with wheel 73 being shown in detail. It is mounted on wheel spindle 75 at the lower end of the bracket 76, the latter including a short vertical part 77, a horizontal part 78 and at the end of the horizontal part another vertical part 79 to the lower end of which the spindle 75 is secured. Bearing 80 mounts the upper end of the short part 77 for rotation on spindle 81 which is carried by the upper frame member 38. Steering arm 82 protrudes laterally from the part 77 of bracket 66 and a hydraulic cylinder assembly 83 operates the steering arm in order to steer the wheel 73 by rotating bracket 76. Hydraulic cylinder assembly 83 consists of a cylinder which is secured to bracket 84 on frame 40 and a piston rod 85 which is pivotally connected to the steering arm 82. Hydraulic cylinder assembly 87 is operatively connected with wheel 71 to similarly steer the same. Hydraulic cylinder assembly 88 is operatively connected with rear wheel 72 while hydraulic cylinder assembly 90 is operatively connected to steer the rear wheel 74. The wheel mounting means are the same in all cases.

The upper frame members of the two frames 40 and 42 have mounting brackets 93, 94 and 95, 96 respectively in pairs thereon. Mounting bars 97 and 98 couple either pairs of these brackets with the tractor in the manner shown in Figure 1 and the rake is ready to be used in a field. As shown in Figure 7 there is a source of hydraulic power schematically represented by the tractor pump 100, plenum chamber 102 and a valve chest 104. This valve chest has an individual control valve for each of the hydraulic cylinders and hydraulic motors and it is located in a position accessible to the driver of the tractor.

When being propelled through the field (Figure 1) with the wheels adjusted as shown in Figure 1 the sides of the rake are held extended without any side thrust on the tractor because of the outward direction of the four wheels. Separating or moving together the rear ends of the frame members in order to adjust the size of the windrows being formed will not affect this.

When it is desired to fold the rake (Figure 3) the hinge connection and hinge pin 56 is broken by pushing it inward slightly and this may be achieved automatically by steering front wheels 71 and 73 inwardly as the tractor is propelled forward in the field. Then, the rake assumes a position which is very easy to move from one place to another in the same field, another field or to and from the field. This condition (Figure 3) is also ideal for storage.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A central delivery hay rake adapted to be propelled by a tractor and moved in advance of a trailing hay baler, said central delivery hay rake comprising a pair of frames, each frame having an elongated frame member with front and rear ends, a pair of hangers depending from said front and rear ends, rotary rake members carried by said frames, each rotary rake member having a plurality of tines and an elongate tine supporting member parallel to one of said frames, a front and rear end, spindles protruding from said front and rear ends of said rake member and mounted rotatively in said hangers, motors carried by said frames and drivingly connected with one spindle of each rotary rake member to drive said rotary rake members, a structural assembly which has a pair of parts, a hinge connecting the confronting ends of said parts together for hinged movement, the opposite ends of said structural assembly parts hingedly attached to the front ends of said frames whereby said front ends of said frames are movable toward each other as said parts of said structural assembly are hingedly moved with respect to each other, a hydraulic cylinder means connecting said cylinder to the rear ends of said frames to extend and withdraw said rear ends of said frames and thereby alter the space between said rear ends of said frames, wheels to support said frames, steerable means mounting said wheels on said frames, and mounting means on one of said frames for attaching said one of said frames to a tractor.

2. The central delivery hay rake of claim 1 wherein said mounting means protrude laterally outwardly from said one of said frames leaving unoccupied the space included between said frames and said rotary members so that when said structural assembly parts are hinged inwardly of and between said frames are brought together in side-by-side relationship.

References Cited in the file of this patent

UNITED STATES PATENTS

| | | |
|---|---|---|
| 2,436,475 | Jones et al. | Feb. 24, 1948 |
| 2,481,995 | Godley | Sept. 13, 1949 |
| 2,509,430 | Guy | May 30, 1950 |
| 2,603,933 | Shore | July 22, 1952 |
| 2,683,345 | Meyer | July 13, 1954 |

FOREIGN PATENTS

| | | |
|---|---|---|
| 1,116,496 | France | Feb. 6, 1956 |